United States Patent
Rodriguez

(10) Patent No.: US 6,440,004 B1
(45) Date of Patent: Aug. 27, 2002

(54) GOLF STANCE AND ALIGNMENT DEVICE

(76) Inventor: Ozzy Rodriguez, 535 Saddle Creek Cir., Roswell, GA (US) 30076

( * ) Notice: Subject to any disclaimer, the term of this patent is extended or adjusted under 35 U.S.C. 154(b) by 0 days.

(21) Appl. No.: 09/920,210

(22) Filed: Aug. 1, 2001

Related U.S. Application Data
(60) Provisional application No. 60/264,133, filed on Jan. 25, 2001.

(51) Int. Cl.[7] .............................................. A63B 69/36
(52) U.S. Cl. ...................... 473/218; 473/270; 473/273
(58) Field of Search ................. 473/270, 218, 473/271, 272, 273, 266, 278

(56) References Cited

U.S. PATENT DOCUMENTS

| | | |
|---|---|---|
| 4,583,739 A | 4/1986 | Kabbany |
| 4,647,048 A | 3/1987 | Welch |
| 4,784,393 A | 11/1988 | Williams et al. |
| 5,083,789 A | 1/1992 | Hickson |
| 5,203,453 A | 4/1993 | Dirito |
| 5,492,328 A | 2/1996 | Lundquist |
| 5,616,085 A | 4/1997 | LaCoste, Jr. et al. |
| 5,944,613 A | 8/1999 | Dubois |
| 5,951,409 A * | 9/1999 | Calley |
| 6,077,168 A | 6/2000 | Huang |
| 6,142,883 A | 11/2000 | Ferrara |

OTHER PUBLICATIONS

Pocket Pro: "The Basics Trainer." <<www.thepocketpro.com/BasicsTrainer_html>>.
12 Principal Rd., Unit 11, Scarborough, ON Mir–423, Canada (Ph: 1–866–700–6073 or (416) 757–2577).

* cited by examiner

*Primary Examiner*—Paul T. Sewell
*Assistant Examiner*—Nini Legesse
(74) *Attorney, Agent, or Firm*—Joel D. Myers; Myers & Associates, P.C.

(57) ABSTRACT

A golf positioning and alignment device having a housing unit, guidance strips and spring loaded wound strip dispensers. More specifically, the present invention is a golf positioning and alignment device having three independently retractable guidance strips all contained within and mounted at the apexes of a substantially triangular housing unit. Each guidance strip is capable of being manually extended to a user-specified position and selectably locked or secured therein. The guidance strips are pulled through apertures or slits in the housing unit, wherein two opposing strips are pulled perpendicular to the golfer's stance and wherein the third strip is pulled forward and secured proximal the golf ball.

13 Claims, 10 Drawing Sheets

GOLF STANCE AND ALIGNMENT DEVICE

PRIORITY CLAIM

This nonprovisional patent application claims the benefit of provisional patent application No. 60/264,133 titled Golf Alignment and Positioning Device filed on Jan. 25, 2001.

TECHNICAL FIELD

This present invention relates generally to golf accessories and more specifically, to golf stance and alignment devices. This invention is particularly useful in assisting golfers practice and improve their swing and ball flight direction.

BACKGROUND OF THE INVENTION

A successful game of golf unmistakably requires much practice and skill. Indeed, the sport demands accuracy in both the golfer's movements and positioning on the golf course. Proper carriage of the ball through the air after tee-off requires that the golfer position himself a certain distance from the ball, and position or align his feet a certain distance apart. The difficulty of the game increases when the golfer is forced to take into consideration the length of his arms and type of golf club used during his swing. This difficulty again, echoes attention to the need of proper positioning and alignment of the golfer with respect to the golf ball.

Most often, in order to properly align and position themselves from the golf ball, golfers will lay one or two other golf clubs on the ground for guidance and alignment purposes. More specifically, a golfer will use one club, or rather a portion of the length thereof, to distance his feet apart, and another club, or portion of the length thereof, to distance himself from the ball, wherein the clubs are perpendicular to each other. This method is easily recognizable as disadvantageous. Not only is this method inefficient, but also highly inaccurate for repeated swings at various locations. The clubs possess no markers or indicator of any sort that would enable the golfer to place the clubs in the exact same position as they were before if the method were to be repeated. Instead, the golfer is forced to eyeball the distance, and through trial and error, will hopefully arrive at a position most favorable to him. Of course, during play, a golfer is only given a limited number of opportunities to employ this trial and error method, further hindering the advancement toward a more consistent and accurate system of distancing, positioning, and aligning himself from the ball with the intended target. Moreover, utilizing this single or dual-club method is unlikely to lead to consistent and favorably results due to the inherent inaccuracies of such a method.

Therefore, it is readily apparent that there is a need for a golf positioning and guidance device wherein accurate and consistent alignment of the golfer with the golf ball is provided resulting in an improved stance, position and distance relative to the golf ball, and ultimately an improved golf game.

BRIEF SUMMARY OF THE INVENTION

Briefly described, in a preferred embodiment, the present invention overcomes the above-mentioned disadvantages, and meets the recognized need for such a device, by providing a golf positioning and aligning device wherein accurate and consistent alignment and guidance is provided for proper positioning, stance and alignment of the golfer from the golf ball, thus improving the golfer's swing and ultimately, carriage of the ball.

According to its major aspects and broadly stated, the present invention in its preferred form is a golf positioning and alignment device having a housing unit, guidance strips and spring loaded wound strip dispensers.

More specifically, the present invention is a golf positioning and alignment device having three independently retractable guidance strips all contained within and mounted at the apexes of a substantially triangular housing unit. Each guidance strip is capable of being manually extended to a user-specified position and selectably locked or secured therein. The guidance strips are pulled through apertures or slits in the housing unit, wherein two opposing strips are pulled perpendicular to the golfer's stance and wherein the third strip is pulled forward and secured proximal the golf ball.

A feature and advantage of the present invention is the consistent alignment and guidance it provides for proper positioning, stance and alignment of the golfer from the golf ball, thus improving the golfer's game.

A feature and advantage of the present invention is its quick, consistent and accurate utilization.

A feature and advantage of the present invention is its lockable guidance strips at desired extensions.

A feature and advantage of the invention is its ability to be employed by both amateur and expert golfers with ease.

A feature and advantage of the present invention is its portability.

A feature and advantage of the present invention is its ability to be stored away with ease.

These and other objects, features and advantages of the invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which.

DETAILED DESCRIPTION OF THE PREFERRED AND ALTERNATIVE EMBODIMENTS

Figure 1:
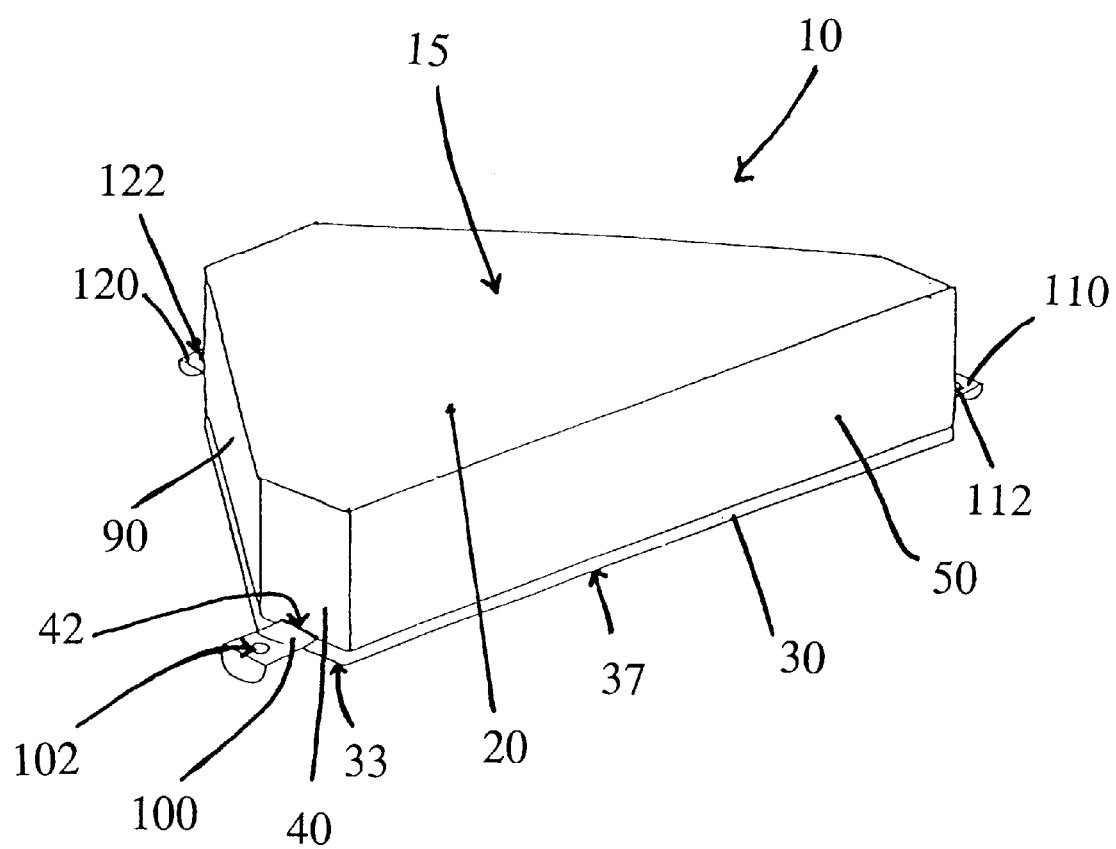
FIG. 1 is a perspective view of a golf positioning and alignment device according to a preferred embodiment of the present invention showing the guidance strips in a non-extended position.
Figure 2:
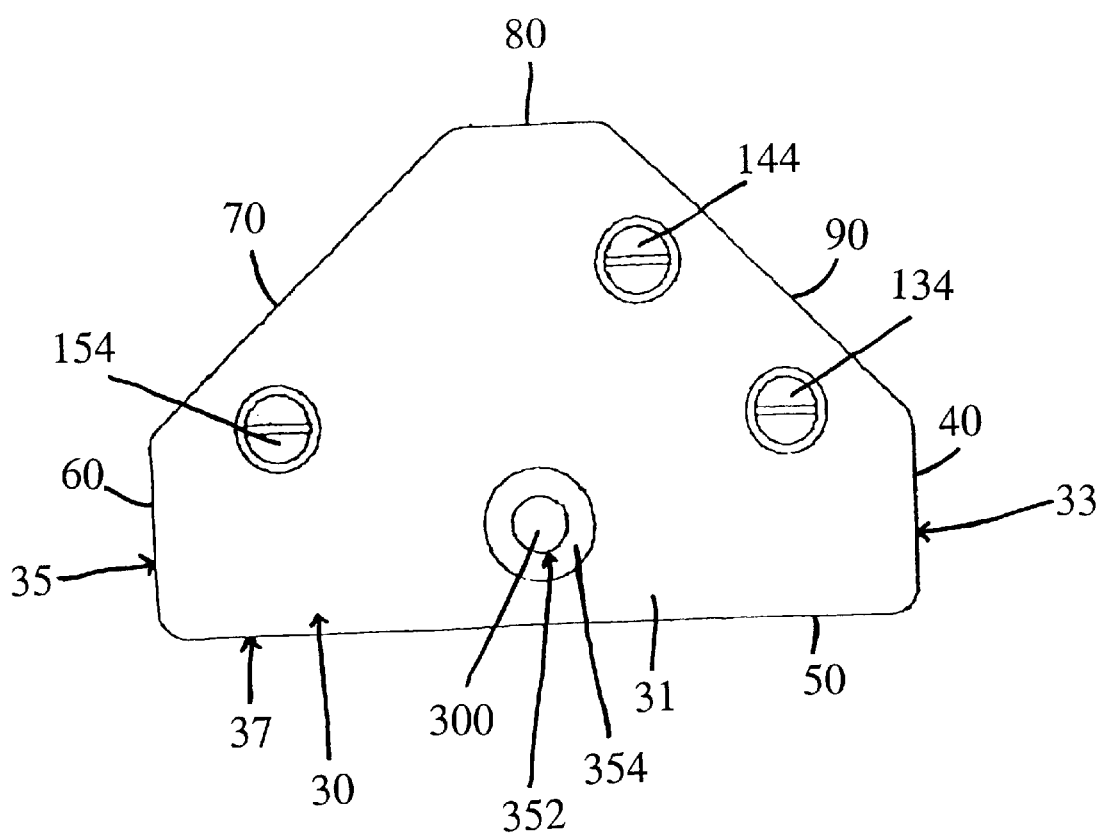
FIG. 2 is a bottom view of a golf positioning and alignment device according to a preferred embodiment of the present invention showing the release button.
Figure 3:
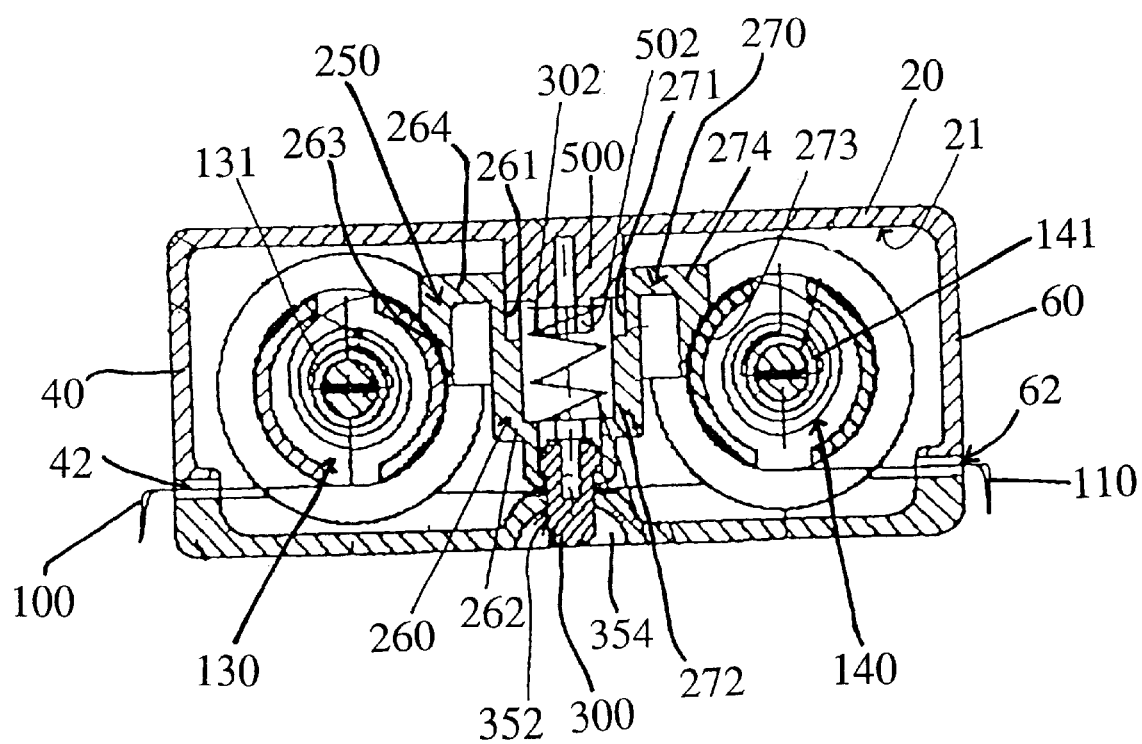
FIG. 3 is a sectional view along line 3—3 of FIG. 1 of a golf positioning and alignment device according to a preferred embodiment of the present invention showing the guidance strip dispensers.
Figure 4:
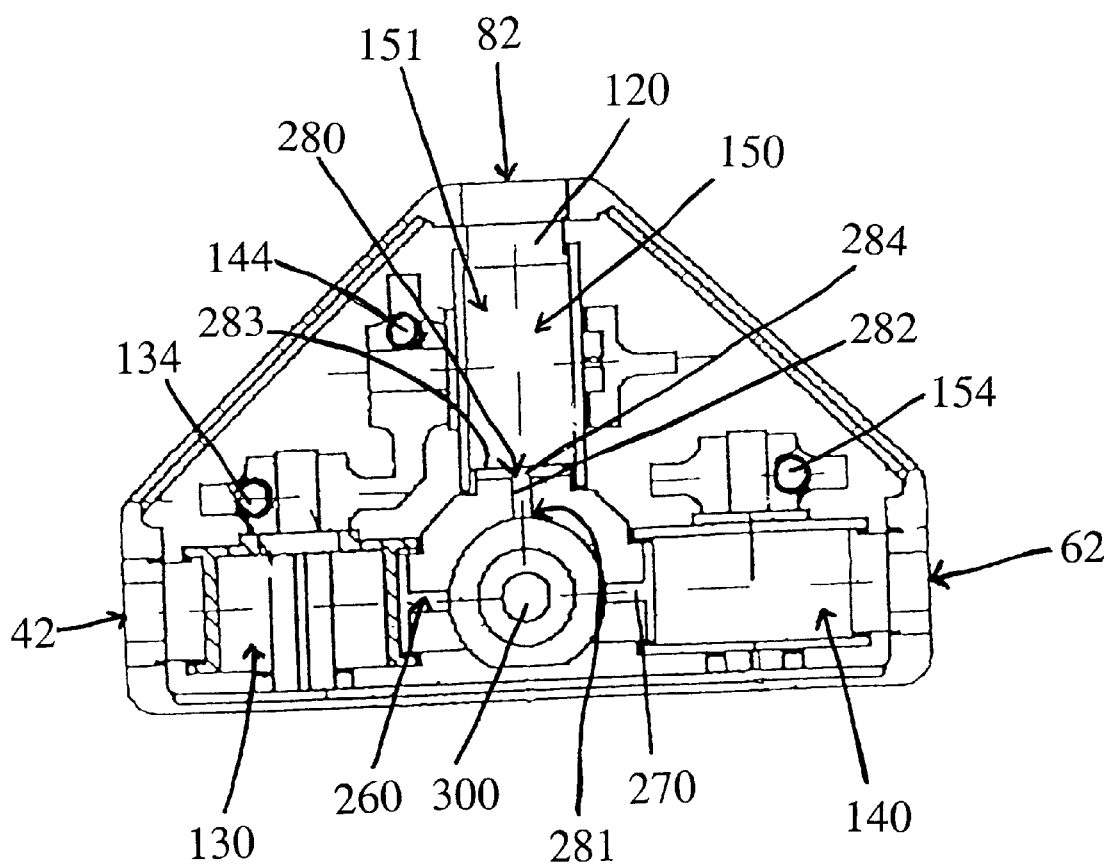
FIG. 4 is a sectional view along line 4—4 of FIG. 1 of a golf positioning and alignment device according to a preferred embodiment of the present invention showing the guidance strip dispensers, locking arms and release button.

In describing the preferred and alternate embodiments of the present invention, as illustrated in FIGS. 1–10, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIGS. 1–4, the present invention in its preferred embodiment is a golf positioning and alignment device 10 generally comprising a top portion 20, a base portion 30, a first side portion 40, a second side portion 50, a third side portion 60, a fourth side portion 70, a fifth side portion 80, a sixth side portion 90 and three guidance strips 100, 110 and 120 dispensed from three guidance strip dispensers 130, 140 and 150, respectively.

Specifically, top portion 20 and base portion 30 are preferably substantially triangular in shape, wherein apexes of top portion 20 and base portion 30 are squared. Although device 10 is preferably substantially triangular in shape, other known shapes may be utilized.

Side portions 40, 50, 60, 70, 80 and 90 join with top portion 20 and base portion 30 to form housing unit 15 that houses guidance strip dispensers 130, 140 and 150. Guidance strip dispensers 130, 140 and 150 are located and preferably abut inner faces of first side portion 40, third side portion 60 and fifth side portion 80, respectively. Guidance strip dispensers 130, 140 and 150 are preferably attached to base portion 30 via screws 134, 144 and 154, respectively, or by any other attaching means known within the art, such as, for exemplary purposes only, adhesives, rivets or bolts, or alternatively could be integrally formed with base portion 30, top portion 20 or any of the side portions. First side portion 40, third side portion 60 and fifth side portion 80 have apertures 42, 62 and 82, respectively, to allow guidance strips 100, 110 and 120, respectively, of guidance strip dispensers 130, 140 and 150, respectively, to be fed through, accessed and extended therefrom.

Guidance strip dispensers 130, 140 and 150 are preferably spring-loaded wound dispensers, wherein tension of helical springs 131, 141 and 151 retract strips 100, 110 and 120 by urging them inward. Positioned within housing unit 15, and preferably proximal guidance strip dispensers 130, 140 and 150, is locking mechanism 250. Locking mechanism 250 preferably comprises L-shaped locking arms 260, 270 and 280 in communication with guidance strips 100, 110 and 120, respectively. More specifically, locking arm 260 has a first generally elongated member 262 connected to a generally U-shaped section 264; locking arm 270 has a first generally elongated member 272 connected to a generally U-shaped section 274; and locking arm 280 has a first generally elongated member 282 connected to a generally U-shaped section 284. The distal ends of generally U-shaped sections 264, 274 and 284 form generally arcuate friction faces 263, 273 and 283, respectively. Generally arcuate friction faces 263, 273 and 283 of generally U-shaped sections 264, 274 and 284, respectively, abut and forcefully push against guidance strips 100, 110 and 120, respectively, via spring 302 so that when guidance strips 100, 110 and 120 are extended to a user-specified position, generally arcuate friction faces 263, 273 and 283 securely hold and lock guidance strips 100, 110 and 120 in their extended positions.

First generally elongated members 262, 272 and 282 are attached to a release button 300, wherein a portion of release button 300 extends outside of housing unit 15 via a throughhole 352 formed through face 31 of base portion 30 of housing unit 15. The portion of the release button 300 that extends outside housing unit 15 is preferably flush with face 31 of base portion 30. Throughhole 352 is formed preferably equa-distant between edges 33 and 35 and proximal edge 37 of base portion 30. Around throughhole 352 is a recessed region 354, dimple-like in form so as to provide easier access to release button 300. Connected to the portion of release button 300 still within housing unit 15 is one end of a spring 302, wherein the opposite end of spring 302 is connected to a smaller diametered section 502 of a guidance block 500 on inner face 21 of top portion 20, thereby urging release button 300 outward through throughhole 352 and maintaining tension of friction faces 263, 273 and 283 against wound guidance strips 100, 110 and 120.

Friction faces 263, 273 and 283 are designed to allow unidirectional extension of guidance strips 100, 110 and 120 while still maintaining enough frictional force against guidance strips 100, 110 and 120 to hold them at a user-specified extended position. Upon depressing release button 300, and thus depressing spring 302, locking arms 260, 270 and 280 as a whole are simultaneously lifted upwards, thereby causing shoulder portions 261, 271 and 281 of first generally elongated members 262, 272 and 282 to slide against guidance block 500 in a generally linear path, thus allowing friction faces 263, 273 and 283 of generally U-shaped sections 264, 274 and 284 to simultaneously disengage from contact with guidance strips 100, 110 and 120 and allow the spring-loaded guidance strip dispensers 130, 140 and 150 to urge guidance strips 100, 110 and 120 inward to a recoiled position.

There are several possible stances a golfer may position himself in during a game. Accordingly, guidance strips 100 and 110 each have several evenly spaced markers or indicators on them, delineating where the golfer may position his feet with respect to his choice of golf club. Specifically, guidance strips 100 and 110 preferably have marked thereon indicators corresponding to woods, long irons, mid-irons and short irons. However, a plurality of indicators are marked thereon to provide incremental adjustments to a golfer's stance. Preferably guidance strip 120 has a plurality of evenly spaced markers, allowing the golfer to choose the length of guidance strip 120 that best positions, distances and aligns the ball from his standing position. Guidance strips 100, 110 and 120 have throughholes 102, 112 and 122, respectively, to allow guidance strips 100, 110 and 120, while extended to a user-specified position, to be pegged or secured into the ground. The ends of guidance strips 100, 110 and 120 that protrude through apertures 42, 62 and 82, respectively, are bent, or angled downwardly to prevent complete recession, and therefore loss, of guidance strips 100, 110 and 120 into housing unit 15 once guidance strips 100, 110 and 120 have been retracted.

Figure 5:
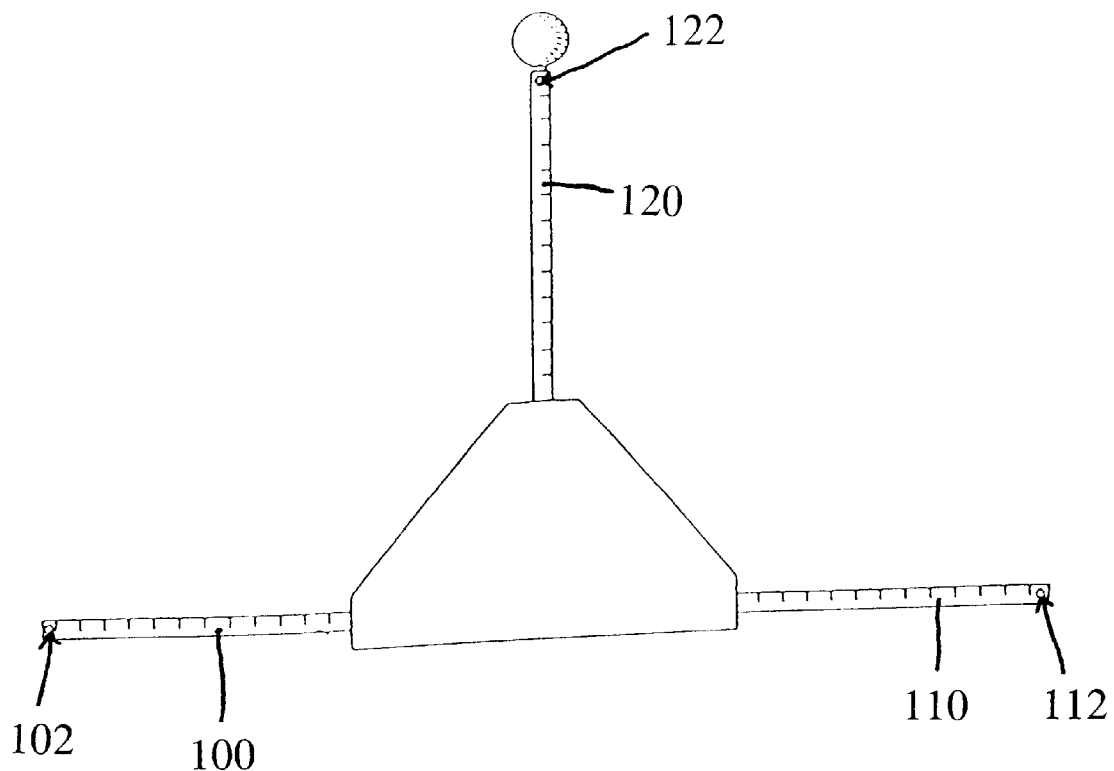
FIG. 5 is a top view of a golf positioning and alignment device according to a preferred embodiment of the present invention showing the guidance strips in an extended position.
Figure 6:
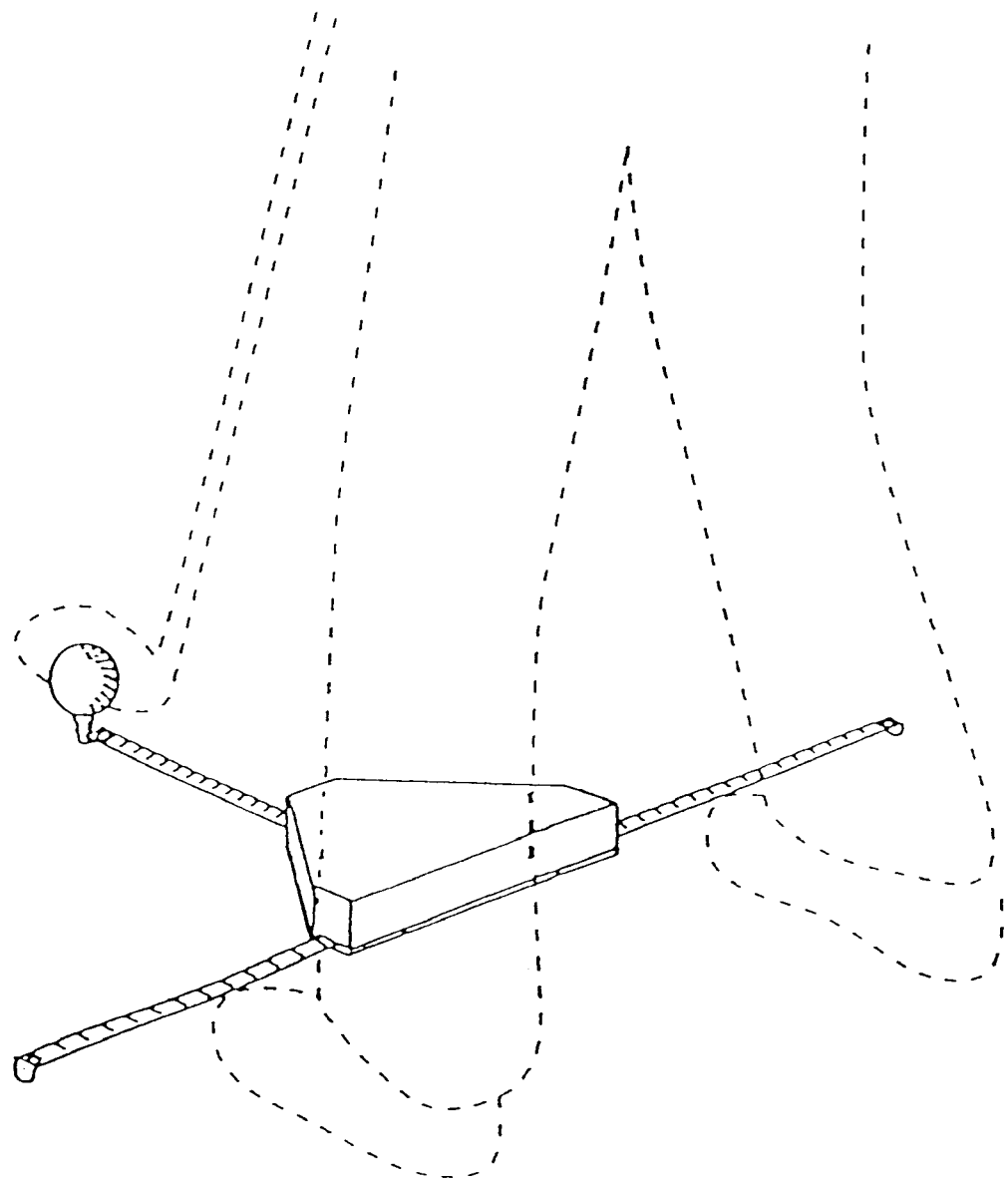
FIG. 6 is a perspective view of a golf positioning and alignment device according to a preferred embodiment of the present invention showing the device in use.

Referring now to FIGS. 5–6, in use, device 10 is employed by extending guidance strips 100, 110 and 120 either to their fullest length, thus exposing all the markers, or to a user-specified position, exposing only desired markers. Guidance strips 100, 110 and 120 are locked therein using locking arms 260, 270 and 280. The golf ball is then placed at the end of guidance strip 120 or alternatively the golf ball is already in position and device 10 is aligned accordingly. Depending on the choice of golf club, the golfer's left foot is positioned at the respective marker on guidance strip 100, and his right foot at the corresponding marker on guidance strip 110. The golfer then swings normally, and the ball is carried through the air with accuracy. Upon completion of the swing, the golfer can depress release button 300, allowing guidance strips 100, 110 and 120 to retract.

Figure 7:
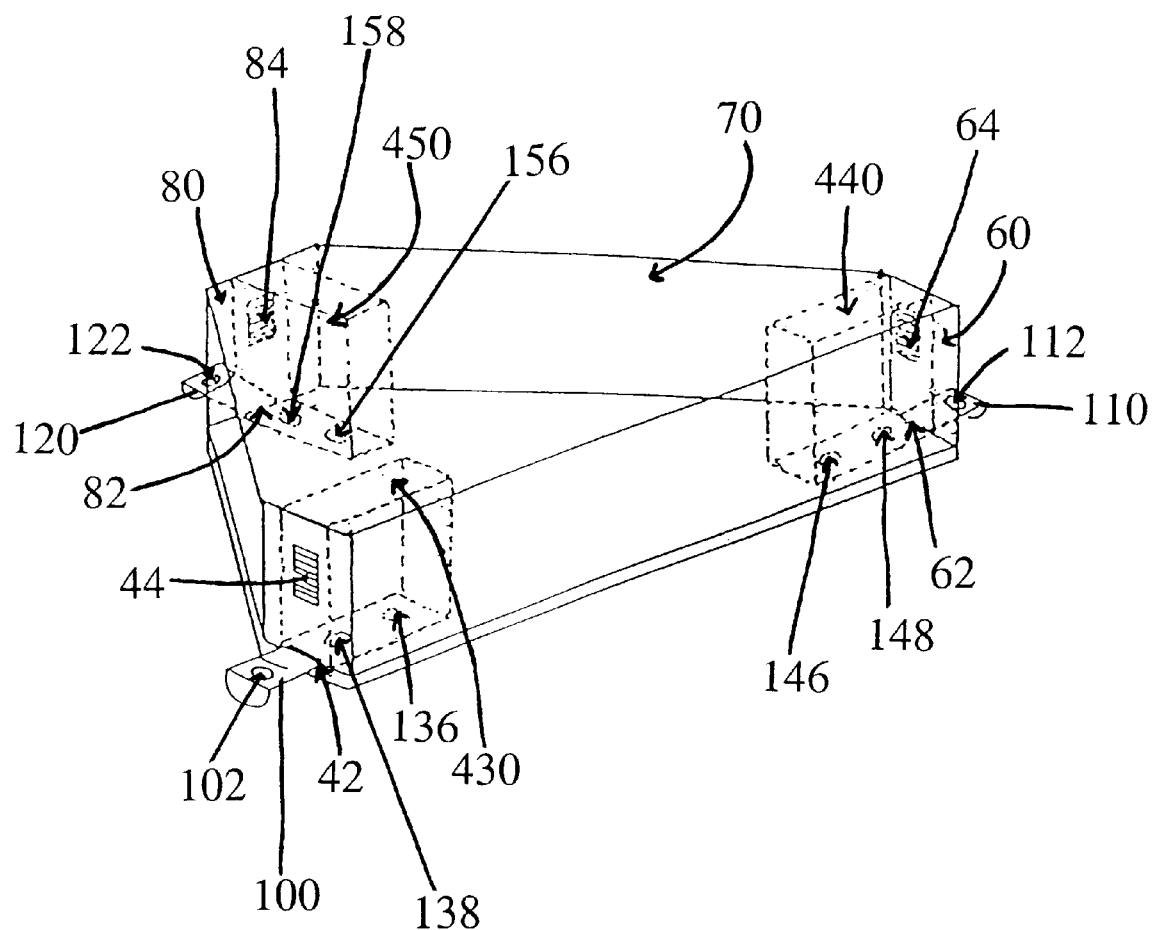
FIG. 7 is a perspective view of a golf positioning and alignment device according to an alternate embodiment of the present invention showing the independently housed guidance strip dispensers and locking switches.

Referring now to FIG. 7, in an alternate embodiment, housing unit 15 would have separately housed guidance strip dispensers 430, 440 and 450 that could be locked independent of one another. First side portions 40, third side portion 60, and fifth side portion 80 of housing unit 15 could have locking switches 44, 64 and 84, respectively, to allow for the selectable locking of guidance strips 100, 110 and 120, respectively, in a user-specified position. Locking switches 44, 64 and 84 can be of the type available and attached to known lockable spring loaded wound dispensers. Guidance strip dispensers 430, 440 and 450 can be of the type that automatically lock guidance strips 100, 110 and 120, respectively, upon extension to a user-specified position, which can then be retracted upon pulling them forward once again and then releasing them, as known in the art. Guidance strip dispensers 430, 440 and 450 could further be secured to base portion 30 of housing unit 15 via bolts 136 and 138, 146 and 148 and 156 and 158, respectively, or by any other attaching means known within the art, such as, for exemplary purposes only, adhesives, rivets or screws.

Figure 8:
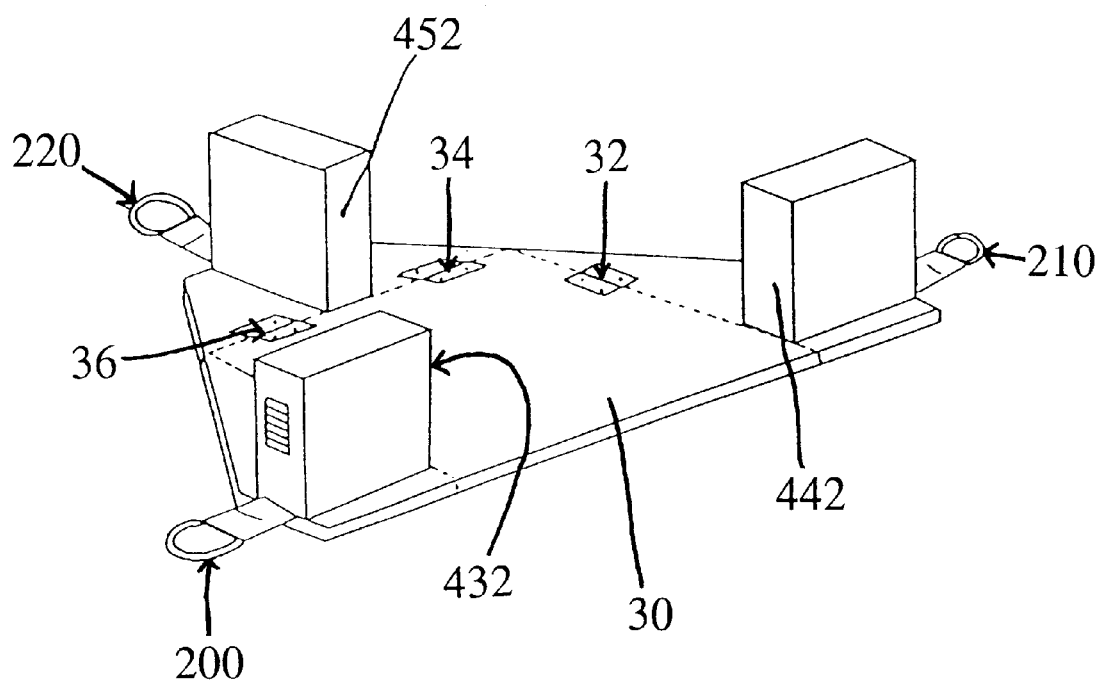
FIG. 8 is a top view of a golf positioning and alignment device according to an alternate embodiment of the present invention showing the guidance strips in a non-extended position.
Figure 9:
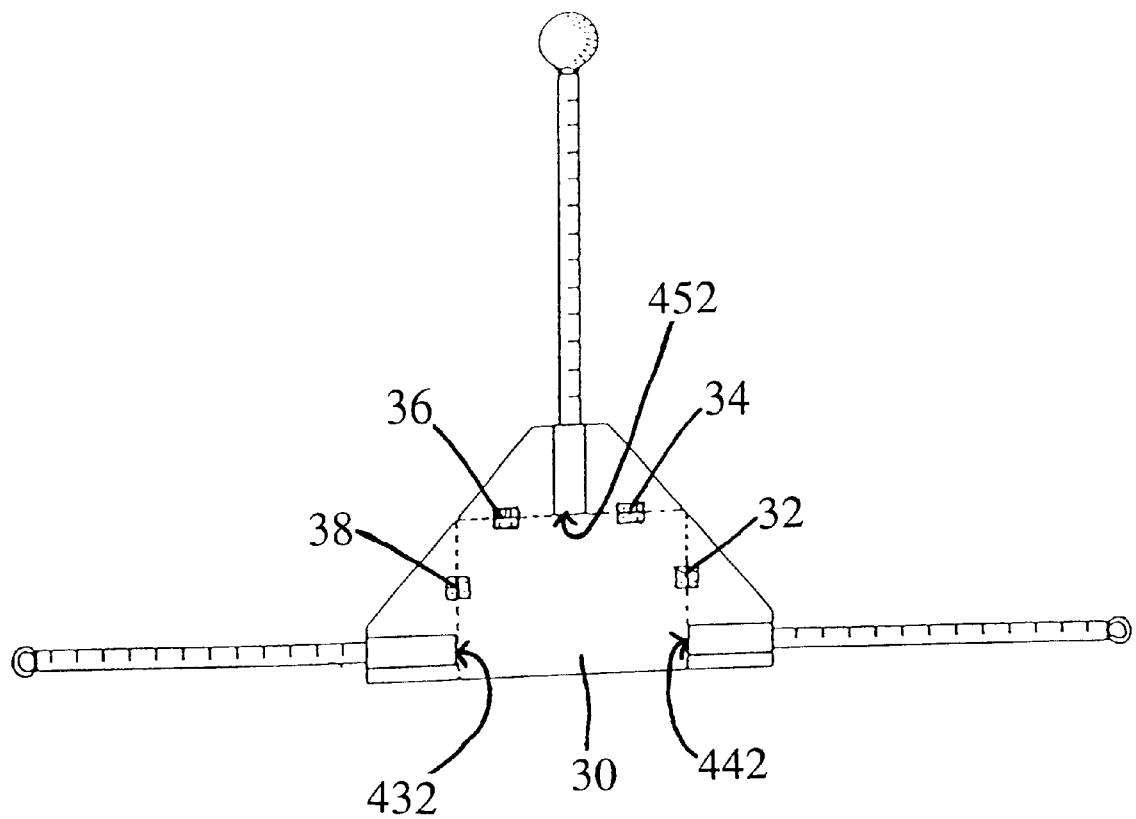
FIG. 9 is a top view of a golf positioning and alignment device according to an alternate embodiment of FIG. 8 of the present invention showing the guidance strips in an extended position.
Figure 10:
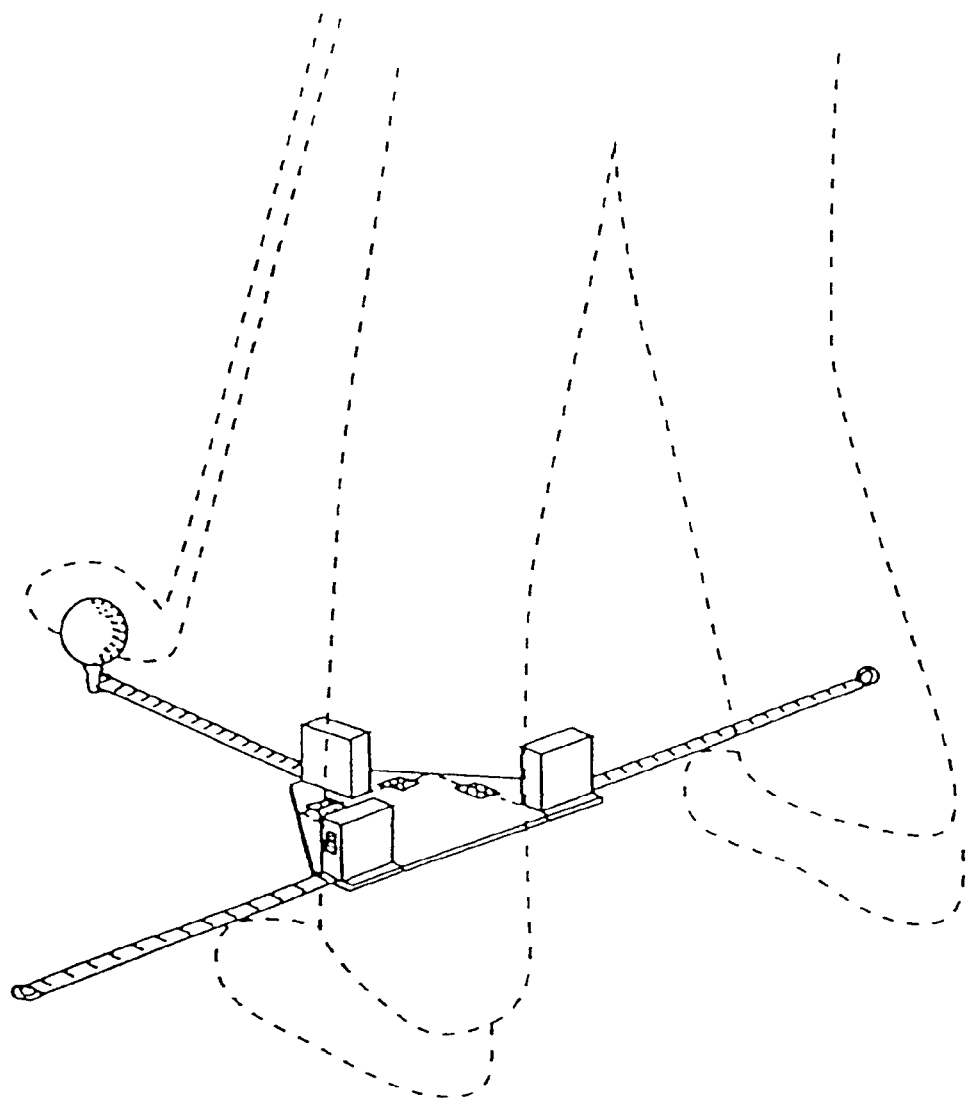
FIG. 10 is a perspective view of a golf positioning and alignment device according to an alternate embodiment of FIG. 8 of the present invention showing the device in use.

Referring now to FIGS. 8–10, golfing device 10 could define an alternate embodiment, such as, for exemplary purposes only, omission of top portion 20 and side portions 40, 50, 60, 70, 80 and 90. Base portion 30 would remain, and would have mounted on it, guidance strip dispensers 430, 440 and 450 via bolts 136 and 138, 146 and 148, and 156 and 158, respectively, or by any other attaching means known within the art, such as, for exemplary purposes only, adhesives, rivets, or screws. Base portion 30 could have hinges 32, 34, 36 and 38, allowing device 10 to be hingeably folded inward for easy storage. Once folded, sides 432, 442 and 452 of guidance strip dispensers 430, 440 and 450, respectively, would abut, or lay flat against top face of base portion 30. Guidance strip dispensers 430, 440 and 450 would also have locking switches 44, 64 and 84, respectively. Again, guidance strip dispensers 430, 440 and 450 and the locking switches 44, 64 and 84 attached respectively thereto, are sold, and are of the type available as known lockable spring loaded wound dispensers. Guidance strip dispensers 430, 440 and 450 can be of the type that automatically lock guidance strips 100, 110 and 120 upon extension to a user-specified position, which can then be retracted upon pulling them forward once again and then releasing them, as known in the art.

In another alternate embodiment, the ends of guidance strips 100, 110 and 120 can alternatively have attached to them rings 200, 210 and 220, respectively, enabling the guidance strips 100, 110 and 120 to be pegged or secured into the ground once they have been extended to a user-specified position.

In yet another alternative embodiment, guidance strips 100, 110 and 120, and guidance strip dispensers 130, 140 and 150, could define another size, such as, for exemplary purposes only, a reduction in width of guidance strips with an accompanying reduction in size of the guidance strip dispensers for an overall smaller, more portable and easily stored device 10.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claim.

What is claimed is:

1. A golf stance and alignment device, comprising:

a housing unit;

a first guidance strip dispenser, wherein said first guidance strip dispenser dispenses a first guidance strip and is housed in said housing unit;

a second guidance strip dispenser, wherein said second guidance strip dispenser dispenses a second guidance strip and is housed in said housing unit;

a third guidance strip dispenser, wherein said third guidance strip dispenser dispenses a third guidance strip and is housed in said housing unit;

a first locking arm, wherein said first locking arm locks said first guidance strip in a selectably dispensed position;

a second locking arm, wherein said second locking arm locks said second guidance strip in a selectably dispensed position;

a third locking arm, wherein said third locking arm locks said third guidance strip in a selectably dispensed position; and a release button, wherein said release button disengages said first, second and third locking arms from said first, second and third guidance strips.

2. A golf stance and alignment device as in claim 1 wherein said housing unit comprises apertures to allow said first, second and third guidance strips of said first, second and third guidance strip dispensers, respectively, to be fed through, accessed and extended or dispensed therefrom.

3. A golf stance and alignment device as in claim 1 wherein said first, second and third guidance strip dispensers are spring loaded to allow spring retraction of said first, second and third guidance strips, respectively after dispensing or extending said first, second and third guidance strips to a selected position.

4. A golf stance and alignment device as in claim 1 wherein said first guidance strips comprises several evenly spaced markers or indicators to delineate where a golfer would position his left foot with respect to his choice of golf club.

5. A golf stance and alignment device as in claim 1 wherein said second guidance strips comprises several evenly spaced markers or indicators to delineate where a golfer would position his right foot with respect to his choice of golf club.

6. A golf stance and alignment device as in claim 1 wherein said third guidance strips comprises a plurality of evenly spaced markers to allow a golfer to position the golf ball a desired distance from his standing position.

7. A golf stance and alignment device as in claim 2 wherein the ends of said first, second and third guidance strips that protrude through said apertures of said housing unit are bent or angled downwardly or upwardly to prevent complete recession of said first, second and third guidance strips into said housing unit when said first, second and third guidance strips have been retracted.

8. A golf stance and alignment device as in claim 2 wherein the ends of said first, second and third guidance strips that protrude through said apertures of said housing unit possess throughholes for pegging said first, second and third guidance strips into the ground when said first, second and third guidance strips have been extended to a user-specified position.

9. A golf stance and alignment device as in claim 2 wherein the ends of said first, second and third guidance strips that protrude through said apertures carry rings for pegging said first, second and third guidance strips into the ground when said first, second and third guidance strips have been extended to a user-specified position.

10. A golf stance and alignment device as in claim 1 wherein said first, second and third locking arms are housed within said housing unit and wherein each of said first, second and third locking arms comprise a first generally elongated member connected to a generally U-shaped section.

11. A golf stance and alignment device as in claim 10 wherein said first generally elongated members of said first, second and third locking arms are connected to said release button, wherein a portion of said release button extends outside of said housing unit for accessibility and release of said locking arms.

12. A golf stance and alignment device as in claim 10 wherein said generally U-shaped sections of said first, second and third locking arms abut and lockably secure said first, second and third guidance strips when said first, second and third guidance strips are in a user-specified position.

13. A golf stance and alignment device as in claim 10 wherein said release button is spring actuated, and wherein depression of said release button causes said first, second and third locking arms as a whole to lift upward and allow said generally U-shaped sections to simultaneously disengage from contact from said first, second and third guidance strips and allow retraction of dispensed said first, second and third guidance strips.

* * * * *